(12) United States Patent
Schöpfer et al.

(10) Patent No.: US 8,098,684 B2
(45) Date of Patent: Jan. 17, 2012

(54) SYSTEM, DEVICE AND METHOD

(75) Inventors: Claus Schöpfer, Wiesloch (DE); Josef Schmidt, Graben-Neudorf (DE); Leobald Podbielski, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 592 days.

(21) Appl. No.: 12/223,555

(22) PCT Filed: Jan. 23, 2007

(86) PCT No.: PCT/EP2007/000527
§ 371 (c)(1),
(2), (4) Date: Jul. 31, 2008

(87) PCT Pub. No.: WO2007/087996
PCT Pub. Date: Aug. 9, 2007

(65) Prior Publication Data
US 2009/0003481 A1    Jan. 1, 2009

(30) Foreign Application Priority Data
Jan. 31, 2006   (DE) .................. 10 2006 004 700

(51) Int. Cl.
*H04J 3/16* (2006.01)
(52) U.S. Cl. ........................ 370/465; 709/250
(58) Field of Classification Search .................. 370/464; 340/310.01, 310.11, 870.02; 345/82; 709/250, 709/218
See application file for complete search history.

(56) References Cited

U.S. PATENT DOCUMENTS

| | | | |
|---|---|---|---|
| 4,514,719 A * | 4/1985 | Suzuki et al. ................. 370/503 |
| 4,535,401 A | 8/1985 | Penn |
| 4,926,158 A | 5/1990 | Zeigler |
| 6,144,292 A * | 11/2000 | Brown ......................... 455/402 |
| 6,614,634 B1 * | 9/2003 | Westerfeld et al. ............. 361/62 |
| 2002/0043517 A1 * | 4/2002 | Koyama et al. ............... 218/154 |
| 2003/0200323 A1 * | 10/2003 | Dold et al. .................... 709/230 |
| 2004/0051628 A1 * | 3/2004 | Uhl ......................... 340/310.01 |
| 2005/0030165 A1 * | 2/2005 | Bateman et al. ......... 340/310.01 |
| 2005/0225469 A1 * | 10/2005 | White ........................... 341/155 |
| 2006/0158035 A1 * | 7/2006 | Brandt et al. ..................... 307/3 |
| 2007/0005141 A1 * | 1/2007 | Sherman ................... 623/18.12 |

FOREIGN PATENT DOCUMENTS

| | | |
|---|---|---|
| DE | 19911217 | 10/2000 |
| DE | 10059219 | 6/2002 |
| JP | 56-158557 | 12/1981 |
| JP | 57-143941 | 9/1982 |
| WO | WO 01/43304 | 6/2001 |

OTHER PUBLICATIONS

International Search Report, PCT/EP2007/000527, dated Jun. 18, 2007.
Translation of International Preliminary Report on Patentability, PCT International Patent Application No. PCT/EP2007/000527, dated Sep. 18, 2008.

* cited by examiner

*Primary Examiner* — Jung Park
(74) *Attorney, Agent, or Firm* — Kenyon & Kenyon LLP

(57) ABSTRACT

A system or device includes a consumer supplied via a supply line, electrical power and data being transmittable via the supply line, the power signal and the data signal being alternately transmittable.

33 Claims, 4 Drawing Sheets

SYSTEM, DEVICE AND METHOD

FIELD OF THE INVENTION

The present invention relates to a system, a device and a method.

BACKGROUND INFORMATION

In certain conventional bus systems, the data are transmittable in accordance with the ASI (Actuator Sensor Interface) method. In this instance, an electrical line is provided for data transmission, which is used only for data transmission.

Modulating alternating currents of higher frequency upon electrical power supply lines such that the power signal and the data signal are transmitted independently of each other is conventional.

SUMMARY

Example embodiments of the present invention provide for reducing the error rate in the date transmission.

According to example embodiments of the present invention, a system or device includes a consumer supplied via a supply line, electrical power and data being transmittable via the supply line, the power signal and the data signal being alternately transmittable. An advantage in this regard is that no interferences from the power signal are present during the period of the transmission of the data signal. Consequently there are fewer errors in the data transmission.

In addition, according to example embodiments of the present invention, a power supply, in particular a power supply system or a power supply unit, is included and one or more consumers supplied via a supply line, the consumers including device(s) for communicating via the supply line and a switching unit being provided for disconnecting the supply line from the power supply. The power signal transmitted by the power supply may be interrupted in order to allow the supply line to be used for data transmission.

The consumers may each have an energy buffer that is supplied from the supply line, in particular in the form of an intermediate circuit of a frequency converter. Thus, the power supply may be interrupted without impairing the operation of the consumers. If the consumer is a frequency converter, then smoothing capacitors or buffer capacitors may be used as energy buffers, as are used in the intermediate circuit of a converter.

The size of the energy buffer may be dimensioned such that the supply of the downstream consumers is ensured for the time of the periodic disconnection of the power signal. Thus, the power signal may be interrupted for such a long period that sufficient time is provided for data transmission.

The switching unit may include device(s) for detecting the power transmitted by the power supply to the consumers at the present moment or on the average over time within a time window, in particular by ascertaining the time characteristic of the current intensity and/or voltage in the supply line or their time averages and/or by calculating the power consumption on the basis of the process steps and/or actions performed by the consumers. Thus the supply line may be utilized in the best possible manner for transmitting data. If the consumer is a converter motor, for example, which drives a driverless transport system or a monorail suspended conveyor, then much power is required at the moment of starting from rest, and only indispensable data may be transmitted, while during periods of uniform movement, by contrast, only a reduced power is required and more complex or more extensive quantities of data such as parameter records or software modifications may be transmitted.

The switching unit may be connected to a central communication unit, in particular a master, the central communication unit having device(s) for communicating with the consumers over the supply line. The master may be able to control the communication with the slaves by taking into account the information regarding the interruption of the power signal. Thus the master is able to plan the transmission of large quantities of data and able to distribute the transmission over the available interruption intervals.

The consumer may be electrically, in particular galvanically, connected to the supply lines. Thus, example embodiments of the present invention may be used in conventional systems, in particular in industrial manufacturing facilities, in which consumers are supplied via supply lines. It may be possible to provide for a consumer suppliable with alternating current or for a single-phase consumer.

The supply lines may have a three-phase design, each consumer being connected to each phase for communication. Thus the switching element is able to disconnect the individual phases at different times, and the consumers do not have to be disconnected entirely from the power supply during a data transmission over a phase. Thus, by switching between the phases, it is possible to realize a continuous data transmission or at least a data transmission with short time intervals between the data packets.

The consumer may be supplied inductively by one or more supply lines, the consumer including a secondary coil for this purpose, which is inductively coupled to at least one supply line, in particular a supply line into which a medium-frequency current is injected. Example embodiments of the present invention may be utilized in freely mobile consumers, it being possible to dispense with trailing cables or sliding contacts. In a system for the contactless supply of consumers, in particular consumers situated in a movable manner, the data may be transmitted from a central station to the respective consumer without additional lines via the same path, that is, the line section, and that additionally the error rate may be reduced. In addition, a customary field bus protocol, for example, ASI, may be used.

A secondary-side capacitor may be situated serially or in parallel to the secondary coil such that the associated resonant frequency agrees with the frequency of the power signal. The power transmission to the consumers may occur via a weak coupling, that is, that the spatial distance between the primary conductor and the secondary coil may be selected within the cm range. Thus a robust supply of power to mobile consumers that is insusceptible to errors is provided, in which example embodiments of the present invention may be utilized.

The power signal may be determined by the time characteristic of the voltage, current intensity, or power in the supply line.

A switch may be provided for switching off, in particular for switching off intermittently, the power signal, the data signal being modulated upon the supply line after switching off the power signal. The two signals may be transmitted alternately and not simultaneously on a single electrical line. Example embodiments of the present invention include the simultaneous transmission of data if multiple supply lines are used, the time intervals for the data transmission in the respective lines adjoining each other. In this manner it is possible to transmit continuously the entire data stream by bringing together the data streams of the individual phases.

The device(s) for communication of the consumers are respectively connected to the secondary coil. Additional coils, in particular for picking up the data signal, may be omitted. Because of the temporal separation of power signal and data signal, a costly separation, for example by filters, may be omitted. The consumers detect only time segments, in which no current flows in the primary conductor, as a signal for the onset of a data transmission. The data transmission may conclude with an end-of-transmission signal. Thus a compact unit is provided for retrieving power and for retrieving data from the primary conductor.

A data signal may be transmitted in the event of a vanishing power signal or in time segments in which the amplitude of the power signal is smaller than a threshold value. In particular, the threshold value is smaller than half of the peak value of the power signal of the supply line. The error rate may be low because the signal-to-noise ratio is better than in conventional methods, in which modulation upon the supply line for the purpose of data transmission occurs even above the threshold value.

Device(s) for filtering the useful data may include device(s) for comparing amplitude and/or comparing frequency. Conventional devices may be used for manufacturing example embodiments of the present invention.

The data may be transmittable in accordance with a field bus transmission method such as, for example, the ASI method. It may be possible to use conventional methods and that thus the data may be transmitted in a quick and simple manner. The manufacturing expenditure is thus low.

The coupling element may be a phase multiplexer and/or a phase demultiplexer, by which data may be transmitted without interruption. The continuous data transmission may be performed in a multiphase system.

According to example embodiments, in a method for data transmission in a system, the power signal and the data signal are not transmitted simultaneously via a physical medium, in particular a supply line. Thus fewer interferences may exist in the data transmission.

The power signal may be periodically switched off in order to transmit the data signal. In particular, the power signal and the data signal are synchronized such that either only a power signal or only a data signal is transmitted. This may provide for reducing the error rate.

The power signal and the data signal may be transmitted alternately via a physical medium, in particular a supply line.

The maximum value of the current intensity of the power signals may be a multiple of, in particular more than ten times, the maximum value of the current intensity of the data signals. The radiation of the data signal into spatial regions of the system may be reducible. In particular, the evaluation electronics for the data signals may be implemented at low cost even though costly filters for isolating the power signal are omitted.

The power signal may be supplied from a constant current source. The supplied power may be regulated by multi-cycle control.

The power drawn by the consumers via the supply line is determined. The power supply may be disconnected in time segments in which no power is required. Thus, in these periods, the supply line may be used for data transmission, and a distortion of the data signal by overload, as is caused, for example, by a simultaneously applied power signal, is avoided.

The length of the time segments for data signals and/or the interval between the time segments for data signals may be determined by the power currently drawn by the consumers. Thus the available transmission capacity of the supply line may be usable for data transmission.

The length of the time segments may be at a minimum if the power requirement of the consumers is above a threshold value and is greater than the minimum if the power requirement is below the threshold value, the minimum being determined by the time span within which the master is able to process a full communication cycle with a consumer. This provides that absolutely necessary commands and/or data, for example, safety shutdowns, information about reaching a final point of a movement, movement commands, may be transmitted to consumers or between consumers without delay.

A time segment may be respectively provided at regular time intervals between the time segment for data signals and the respectively following time segment for the power signal, in which neither data signals nor power signals are provided, in particular for the purpose of extinguishing arcs in systems having a contactless power supply. The system may be secure against the formation of arcs in unanticipated power interruptions, for example in line breaks.

The time segments for data signals may be marked by pulses in the supply line. The consumers may be able to synchronize their communication and the time segments for data signals may be more readily detectable.

The pulses for marking the time segments for data signals may contain information regarding the duration over which the marked time segment extends, in particular by indicating the multiple of a minimum. The consumers may be able to plan their communication, in particular the distribution of data to be transmitted over time segments.

The supply line may include multiple phases, which are disconnected at different times from the power supply such that the respective time segments for data signals succeed one another in time for forming a continuous communication channel. This makes it possible to implement a data transmission without delay, in particular in real-time.

In a three-phase supply line, in particular an alternating current line, the power signals of the three phases may be shifted by 120° with respect to one another, the respective power signal being switched off for a time interval in the area of each zero crossing. The total data transmission may be performed at the low error rate not only in the short time interval related to a phase, but over longer periods.

The time interval may be 60°, that is, ⅙ of the period of the power signal, in particular so as to allow for an uninterrupted data transmission. It is possible to implement a continuous data transmission when the intervals are chosen skillfully. The 60° may be arranged, for example, symmetrically around the zero point. Alternatively, the 60° may be arranged beginning at the zero point, which makes it particularly simple to implement a leading-edge phase control of the power signal.

In the case of a different number of phases, the 60° must be changed accordingly. In particular, in n phases, the phase shift between the phases is 360°/n and the time interval is 180°/n.

The data signals may be transmitted in accordance with the AS interface protocol or the CAN (Controller Area Network) protocol or in the OFDM (Orthogonal Frequency Division Multiplexing) method. Example embodiments of the present invention may be utilized in a wide range of industrial applications that use standardized methods or protocols for transmitting data.

In the following description, the terms threshold value, peak value, power signal and data signal chiefly refer to voltage values or current values.

Figure 1:
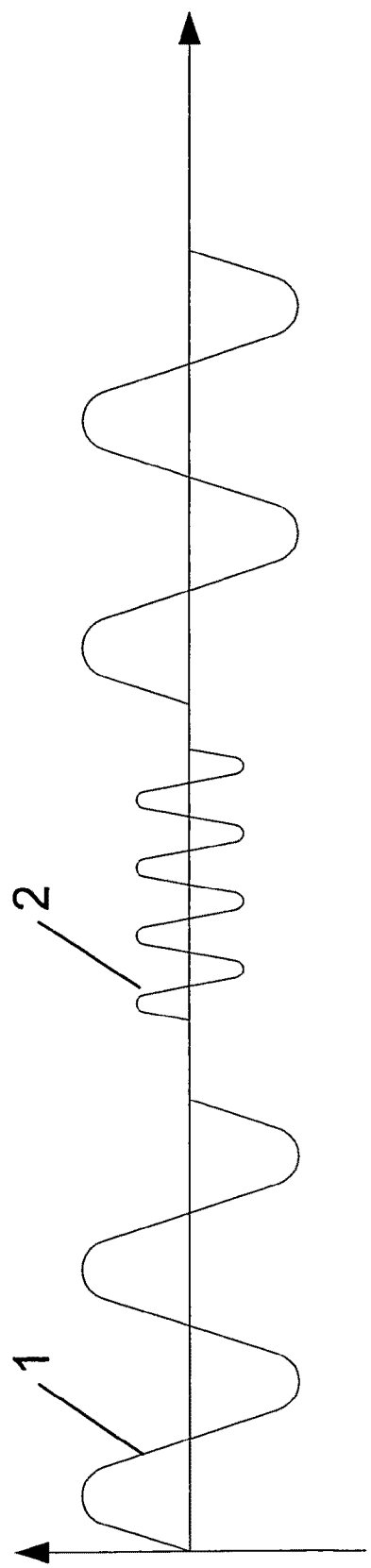
FIG. 1 illustrates a principle according to example embodiments of the present invention.

LIST OF REFERENCE NUMERALS 1 power signal
2 data signal
3 current characteristic
4 intermediate circuit voltage
5 data signal
6 line section
7 load
8 phase switch
9 coupling element
10 coupling element
11 synchronization pulse
21 time segment
L1, L2, L3 network phases
40 consumers
41 primary conductor
42 secondary coils
43 device for rectifying
44 buffer, electrical energy store
45 power signal
46 interruption of the power signal
47 data signal
48 master
49 coupling element
50 synchronization line
51 switching element
52 slave
53 constant current source
54 power supply
55 current measuring device
56 gap

DETAILED DESCRIPTION

Example embodiments of the present invention are explained in greater detail with reference to the appended Figures.

A principle according to example embodiments of the present invention is indicated in FIG. 1. In this instance, the power signal is interrupted in one time segment. This is used for data transmission by data signal 2.

The time segment for the data transmission is a multiple, in particular an integral or half-integral multiple or a more than tenfold multiple, of the period of the power signal.

Figure 3:
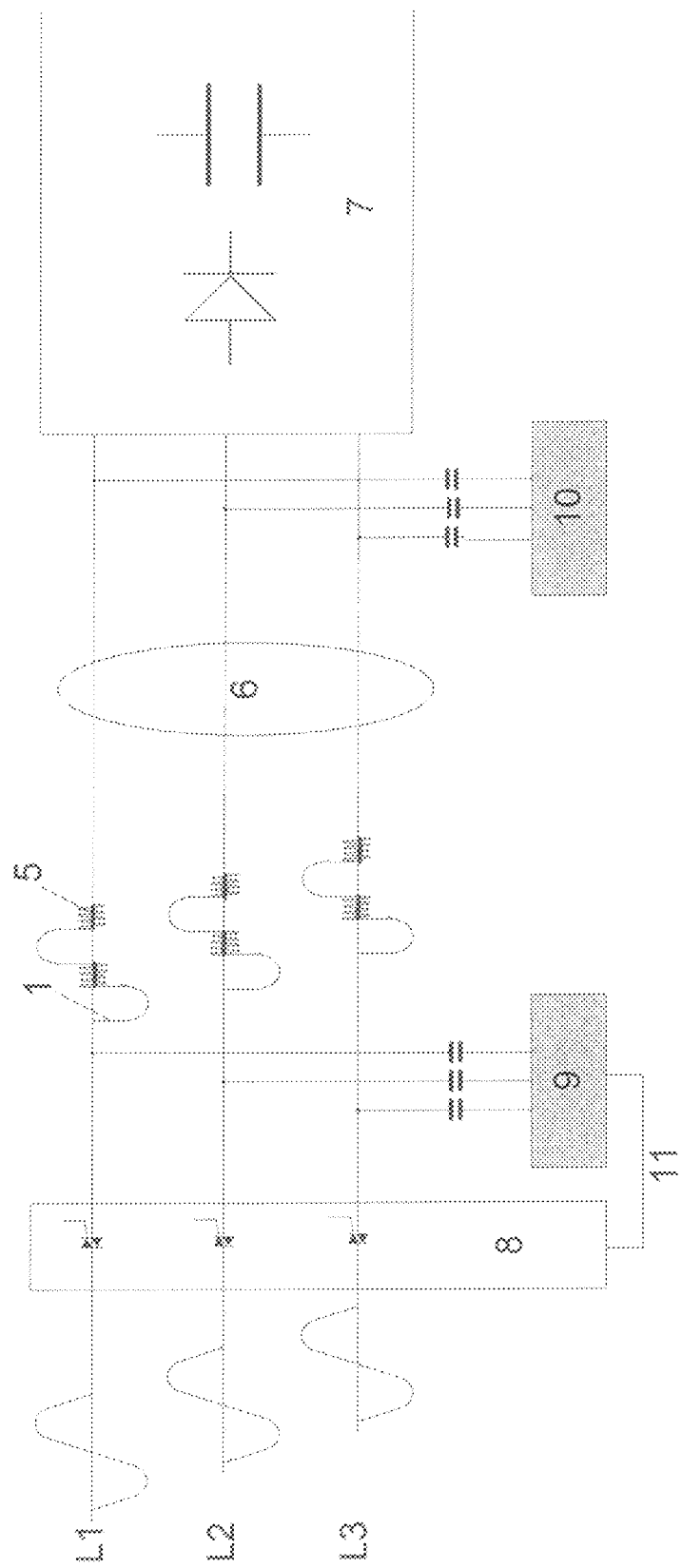
FIG. 3 illustrates a device according to an example embodiment of the present invention.

FIG. 3 shows a device according to an example embodiment of the present invention in which the network phases L1, L2, L3 are connected to a phase switch 8, which is made up of thyristors, for example. In other exemplary embodiments according to the present invention, however, other semiconductor switches may be used, each phase being individually disconnectible.

When the power signal is interrupted, a data stream is modulated at high frequency upon line section 6 supplied by phase switch 8 using coupling element 9, which is synchronized by a synchronization pulse 11. For this purpose, switches 8 are operated synchronously with respect to the high-frequency modulation.

In this exemplary embodiment, the time segments in which the power signal is interrupted are shorter than a half-wave of the power signal. In addition, these time segments are respectively situated in the area of the zero crossings of the power signal.

Power signal 1 and data signal 5 are indicated in FIG. 3. The latter, to be sure, shows a three-phase variant of line segment 6 of the supply. Single-phase or multi-phase systems, however, may also be analogously equipped.

A 120° phase shift between the signals of the three phases is also indicated in the drawing of FIG. 3.

At the end of the line section before or in the consumer, another coupling element 10 is situated, which allows for the data modulated at high frequency to be demodulated.

The consumer is only indicated symbolically as load 7. This is a converter, for example, or another electronic device comprising a control system.

This control system is connected to coupling element 10 for the purpose of exchanging data.

The consumer takes the form of a converter and includes in particular a rectifier, an intermediate circuit and an inverter-power stage of a converter, the rectifier supplying the intermediate circuit and the intermediate circuit having an intermediate circuit capacitor for smoothing out the rectified power signal and for buffering power fluctuations. The intermediate circuit is therefore used as an energy buffer in supplying load 7.

The buffer capacity may be selected to be so small that energy is buffered only for the period of a half-wave, thus that it is possible to supply the downstream consumer.

If the intermediate circuit voltage has a value other than zero, then, in the case of a sinusoidal power signal, only a part of each half-wave is utilizable for charging the intermediate circuit, but not the full period.

Figure 2:
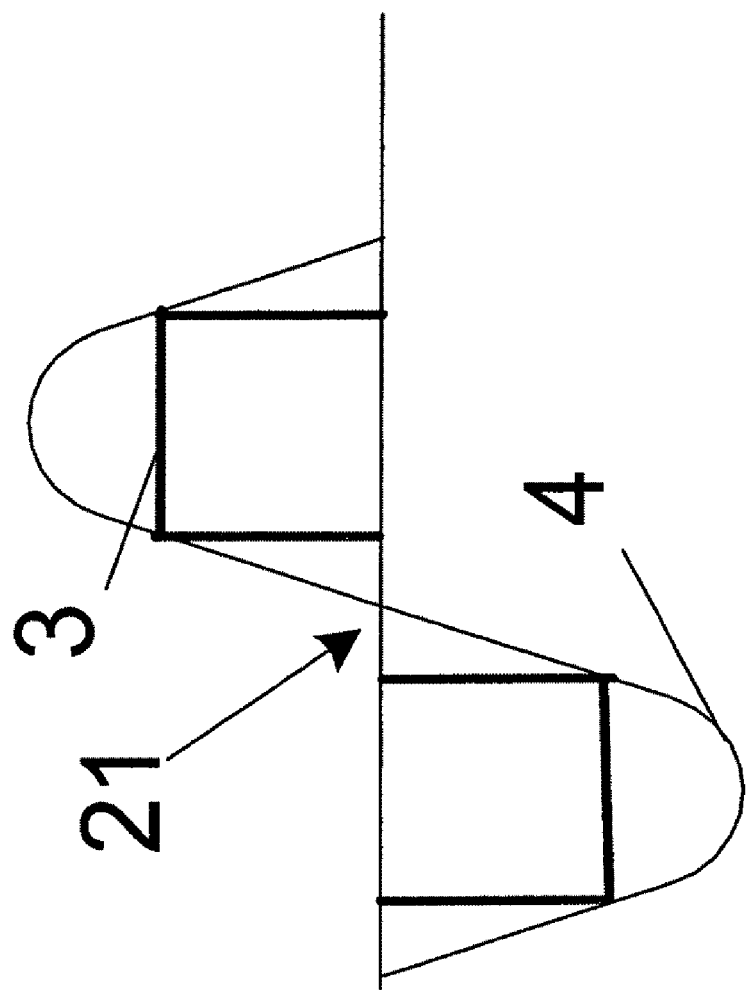
FIG. 2 illustrates a portion of each half-wave utilizable for charging for a full period of a power signal.

FIG. 2 shows this portion for a full period of the power signal. The figure shows the voltage characteristic of the power signal. Only if the instantaneous voltage value of power signal 7 lies above instantaneous voltage value 3 in the intermediate circuit is it possible to charge the intermediate circuit via the rectifier. The time segments 21 of the power signal lying outside of this segment are dispensable for the purpose of supplying the load and are thus utilizable for data transmission.

In refinements, the segments dispensable for the supply of power are switched to be free of power by a leading-edge phase control or a trailing-edge phase control, in particular via a phase switch 8.

In a refinement, multiple consumers are supplied via line segment 6, which consumers are respectively able to exchange data signals with line segment 6 via a coupling element 10. The basic principle described herein is transferable to a multitude of consumers and different networks. The injection of the data signals into line segment 6 may occur in a galvanic, inductive, capacitive or optical manner, for example.

In an alternative exemplary embodiment, the power drawn by the consumer or the consumers is ascertained on phase switch 8 and the power signal is temporarily interrupted, e.g., via a multi-cycle control, in order to provide time segments for data transmission.

The sum of the durations of a time segment for data signals and the subsequent time segment for the power signal is respectively constant, and the relative proportion of the two segments is varied depending on the power requirement. For this purpose, the time segment for data signals is kept above a minimum duration that is required for transmitting a smallest quantity of information.

For example, a load 7 takes the form of a drive of a transport vehicle or a suspended car of a monorail suspended conveyor, which has a higher power requirement when starting from rest and has a reduced power requirement when in uniform motion. In this case, simple commands and/or information, for example for determining position, may be exchanged during the increased power requirement within the segments for data signals that are reduced to a minimum, while during uniform motion additionally voluminous data packets such as parameter records and/or state information may be exchanged.

In a refinement, the time and/or duration of these time segments is transmitted via synchronization pulses 10 to coupling element 9, which may take the form of a bus master of the data transmission, and/or information regarding the time and/or duration of these time segments is transmitted via line segment 6 to the consumers, in particular as pulses to coupling elements 9 and/or 10.

All methods of signal transmission in telecommunication technology may be used for transmitting the information and/or data. In particular, the signal for transmitting data is frequency-modulated and/or amplitude-modulated and/or phase-modulated and/or encoded using the OFDM method. The data may be transmitted in accordance with the AS interface bus protocol or the CAN bus protocol or another bus protocol. For example, frequencies may be used for signal transmission that are not considerably above the frequency of the power signal. In particular, frequencies below 300 kHz, e.g., 150 kHz, may be used. Thus it is possible to avoid impairing general radio communication by the data transmission.

Figure 4:
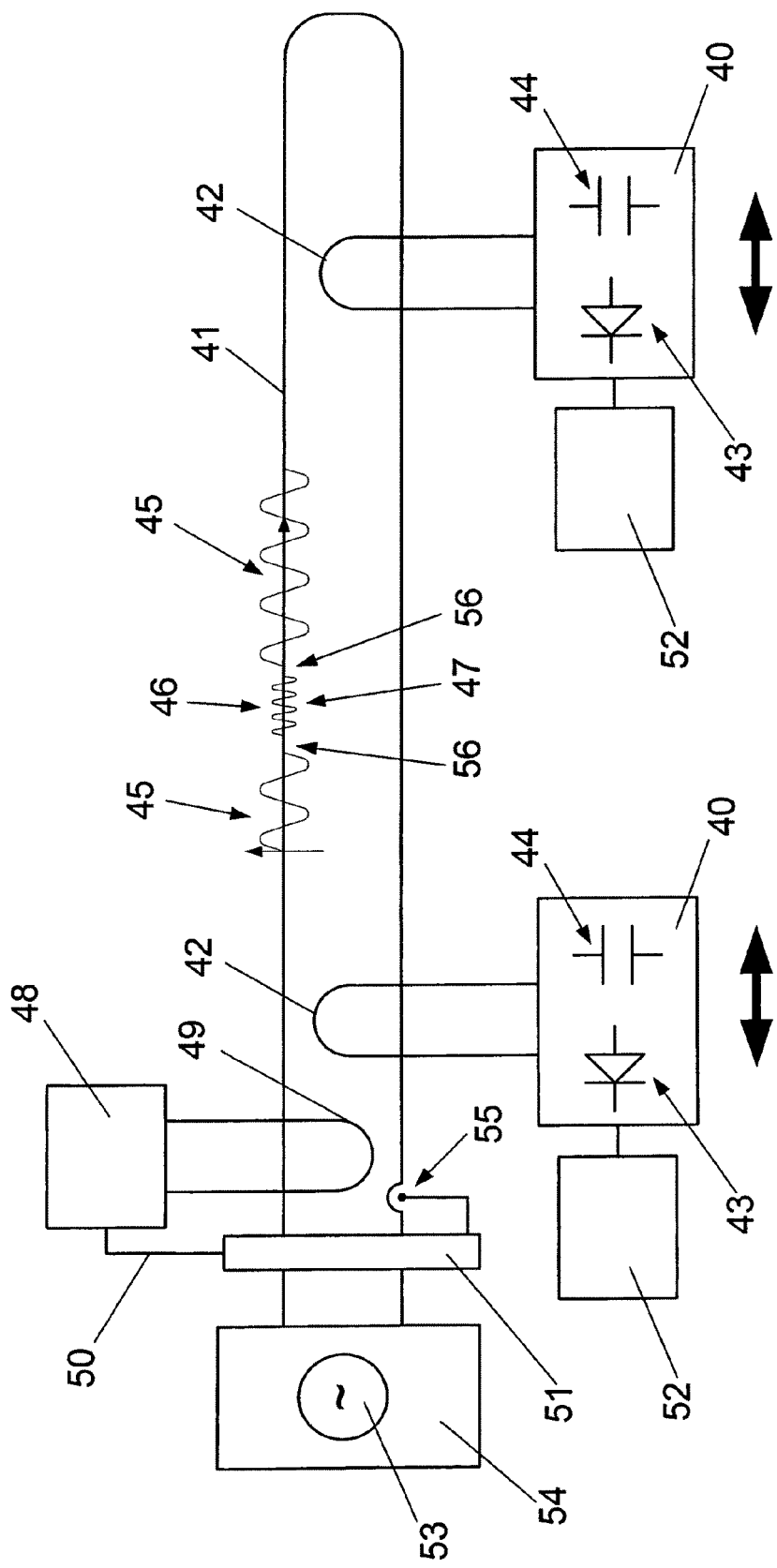
FIG. 4 illustrates another exemplary embodiment of the present invention.

FIG. 4 shows another exemplary embodiment of the present invention. A consumer or multiple consumers are supplied inductively via a supply line, a primary conductor 41. For this purpose, a power supply 54 has a constant current source 53, which superposes a current of constant amplitude and frequency, called power signal 45, onto a primary conductor 41. Via secondary coils 42, consumers 40 are inductively coupled to primary conductor 41 in a weak manner. The exemplary embodiment is thus a system having a contactless energy supply. In this context, on the secondary side, that is, on secondary coils 42, a capacitor is connected serially or in parallel such that a resonant frequency is established that matches the frequency of the injected primary conductor current, that is, power signal 45. For example, current injected as power signal 45 having a current intensity of 10 A or more, e.g. 60 A or 100 A, and having a frequency of 10 kHz to 100 kHz, e.g. 20 kHz or 25 kHz is used.

Consumers 40 are thus mobile along primary conductor 41.

Consumers 40 each have a rectifying device 43 and a buffer 44 for the temporary storage of electrical energy. Buffers 44 take the form of capacitors, the capacitance being dimensioned such that a primary-side interruption of power signal 45 for some half-waves may be compensated.

For example, frequencies may be used for signal transmission that are not considerably above the frequency of power signal 45. In particular, frequencies below 150 kHz may be used. Thus, the propagation behavior of data signal 47, in particular the damping rate, is substantially equal to that of the power signal.

The flow of current from power supply 54 to primary conductor 41 may be interrupted by a switching element 51. For this purpose, switching element 51 includes thyristors, which are used to implement a leading-edge phase control or a multi-cycle control.

FIG. 4 shows an exemplary temporal signal characteristic in primary conductor 41. Power signal 45 is interrupted in a segment 46. In this span 46, data signals 47 may be transmitted. These data signals are only indicated schematically in the figure, and they carry information in accordance with the AS interface protocol. Alternative protocols or methods, for example the CAN bus protocol, the OFDM method or another bus protocol or transmission method may be used.

Between the time segments for power signal 45 and the time segments for data signals 47, additional temporal gaps 56 are preferably provided, in which no signal at all is transmitted. Thus, arcs possibly forming in cable ruptures or unintentional splitting of primary conductor 41 are safely extinguished.

Alternatively, every nth, n designating a natural number, in particular every tenth or every hundredth time segment for data signals does not have a data signal applied to it, or time segments for data signals remain signal-free according to another, for example, irregular, random, pattern. Resonances may be preventable due to the irregular arrangement of segments 46.

In the exemplary embodiment as shown in FIG. 4, power signal 45 and data signal 47 may be coupled out via a schematically represented shared secondary coil 42. Data transmission errors by overload by an excessively strong power signal 45 as background of data signal 47 may be securely prevented by the alternating use of primary conductor 41. Costly filter technology, in particular in mobile consumers 40, for separating data signal 47 and power signal 45 is thus dispensable.

The data signals are coupled in and coupled out inductively, that is, by regulating or detecting the associated current intensity. In alternative exemplary embodiments, the data signals are coupled in capacitively by regulating the voltage associated with the data signal.

In the exemplary embodiment shown in FIG. 4, device(s) are additionally provided for detecting the power drawn by consumers 40 from power supply 54. For this purpose, a current measuring device 55 detects the current intensity flowing in the primary conductor, and a voltage measuring means is integrated in the switching element. An electronics, which may be integrated into the switching element, ascertains from the measured values time averages of the drawn power, e.g., with respect to a firmly selected time window.

On the basis of the power drawn instantaneously or on average in a time window, an electronics, e.g., situated in switching element 51 calculates respectively how often and how long the power supply may be interrupted without impairing the power supply of consumers 40. Thus the temporal length of segments 46 as well as their temporal frequency are adapted to the instantaneous power requirement of consumers 40 on primary conductor 41.

Switching element 51 is connected to the master 48 of an AS interface bus system via a synchronization line 50. Via synchronization line 50, the electronics in switching element 51 transmits information regarding the time and, e.g., regarding the length of the next segment 46 of the interruption of the power signal. Thus master 48 is able to plan the communication with slaves 52 on consumers 40, in particular their temporal sequence and their data scope. Master 48 applies data signals to a coupling element 49, which data signals are coupled into the primary conductor inductively or alternatively capacitively for communicating with consumers 40.

For example, segments 46 of the interruption of the power signal are established by the electronics of switching element 51 such that within a segment 46, master 48 is able to call up at least one slave 52 and is able to receive a reply from the latter. Thus, segments 46 have a minimum temporal length that results from the cycle times of the bus system.

The buffer capacity is coordinated with the maximum allowed duration of a segment 46 such that the power interruption is buffered only for the maximum duration of a segment 46, thus, that it is possible to supply the downstream consumer 40.

In the alternative use of other data transmission methods, the minimum length of segments 46 results from other boundary conditions, for example, in the OFDM method by the symbol duration or in the CAD protocol by addressing and useful data transmission.

Switching element 51 may include a for transmitting signals, in particular bursts, which describe the beginning of a segment 46 and/or the length of the subsequent segment 46. For example, by a number of bursts it is possible to mark that the following segment 46 has a temporal length that is composed of the transmitted number of elementary segments.

What is claimed is:

1. A system, comprising
  a power supply;
  at least one consumer supplied via a supply line, each consumer including a communication device configured to communicate via the supply line and a switching unit configured to disconnect the supply line from the power supply;
  wherein the switching unit includes a detection device configured to detect power transmitted by the power supply to the consumer at least one of (a) at a present moment and (b) on an average over time within a time window, by at least one of (I) ascertaining a time characteristic of at least one of (a) a current intensity, (b) a voltage in the supply line, (c) time averages of at least one of (i) the current intensity and (ii) the voltage in the supply line and (II) calculating a power consumption in accordance with at least one of (a) process steps and (b) actions performed by the consumers.

2. The system according to claim 1, wherein electrical power and data are transmittable via the supply line, and a power signal and a data signal are alternately and not simultaneously transmittable.

3. The system according to claim 2, wherein the switching unit is configured to at least one of (a) switch off and (b) intermittently switch off intermittently the power signal, the data signal being modulatable upon the supply line after switching off the power signal.

4. The system according to claim 2, wherein the data signal is transmittable at least one of (a) in the event of a vanishing power signal and (b) in time segments in which an amplitude of the power signal is smaller than a threshold value.

5. The system according to claim 4, wherein the threshold value is smaller than half of a peak value of the power signal of the supply line.

6. The system according to claim 2, wherein the data are transmittable in accordance with an ASI (Actuator Sensor Interface) method.

7. The system according to claim 1,
  wherein a power signal from the power supply and a data signal from the communication device are switched by the switching unit such that the power signal and the data signal are alternately and not simultaneously transmittable.

8. The system according to claim 7, wherein the power supply is arranged as at least one of (a) a power supply system and (b) a power supply unit.

9. The system according to claim 7, wherein each consumer includes at least one of (a) an energy buffer and (b) an intermediate circuit of a frequency converter suppliable from the supply line.

10. The system according to claim 9, wherein the energy buffer is dimensioned such that the supply of downstream consumers is ensured for a time of a periodic disconnection of a power signal.

11. The system according to claim 7, wherein the switching unit is connected to at least one of (a) a central communication unit and (b) a master, the at least one of (a) the central communication unit and (b) the master including a communication device configured to communicate with the consumer via the supply line.

12. The system according to claim 7, wherein the consumer is inductively supplied by at least one supply line, the consumer including a secondary coil for the inductive supply inductively coupled to at least one supply line, a medium-frequency current injectable into the supply line.

13. The system according to claim 12, wherein a capacitor is arranged at least one of (a) serially and (b) in parallel to the secondary coil such that an associated resonant frequency matches a frequency of a power signal.

14. The system according to claim 12, wherein the communication device of the consumer is connected to the secondary coil.

15. The system according to claim 7, wherein the power signal is determinable by a time characteristic of at least one of (a) a voltage, (b) a current intensity, and (c) a power in the supply line.

16. The system according to claim 7, further comprising a filter device configured to filter useful data, the filter device including a comparison device configured to at least one of (a) compare amplitudes and (b) compare frequencies.

17. The system according to claim 7, wherein the consumer is connected at least one of (a) electrically and (b) galvanically to the supply line.

18. The system according to claim 7, wherein the supply line includes a three-phase design, each consumer being connected to each phase for communication.

19. The system according to claim 7, further comprising at least one of (a) a phase multiplexer and (b) a phase demultiplexer as a coupling device that provides for an uninterrupted data transmission.

20. A method for data transmission in a system, comprising:
  transmitting a power signal and a data signal alternately over at least one of (a) a physical medium and (b) a supply line;
  determining at least one of (a) a length of time segments for data signals and (b) an interval between the time segments for data signals by a power currently drawn by a consumer;
  wherein a length of the time segments is at a minimum if a power requirement of the consumer is above a threshold value, and the length of the time segments is greater than a minimum if the power requirement is below the threshold value, the minimum being determined by a time span within which a master is able to process a full communication cycle with a consumer.

21. The method according to claim 20,
  wherein the power signal and the data signal are not simultaneously transmitted.

22. The method according to claim 21, further comprising switching off the power signal periodically for transmitting the data signal.

23. The method according to claim 21, further comprising synchronizing the power signal and the data signal such that only the power signal or only the data signal is transmitted.

24. The method according to claim 21, wherein a maximum value of a current intensity of the power signal is at least one of (a) a multiple of and (b) more than ten times a maximum value of a current intensity of the data signal.

25. The method according to claim 21, further comprising supplying the power signal from a constant current source.

26. The method according to claim 21, further comprising at least one of (a) determining, (b) determining at a present moment, and (c) determining on average within a time window power drawn by a consumer over the supply line.

27. The method according to claim 21, wherein time segments for data signals are marked by pulses in the supply line.

28. The method according to claim 27, wherein the pulses for marking the time segments for data signals include at least one of (a) information regarding a duration of the marked time segment and (b) a multiple of a minimum.

29. The method according to claim 21, wherein the supply line includes multiple phases respectively disconnected at different times from a power supply such that respective time segments for data signals succeed one another in time to form a continuous communication channel.

30. The method according to claim 21, wherein in at least one of (a) a three-phase supply line and (b) an alternating current line, the power signals of three phases are shifted by 120° with respect to one another, the respective power signal being switched off in an area of each zero crossing for a time interval.

31. The method according to claim 30, wherein the time interval is 60° to provide for an uninterrupted data transmission.

32. The method according to claim 21, wherein the data signals are transmitted in accordance with at least one of (a) an AS interface (Actuator Sensor Interface) protocol, (b) a CAN (Controller Area Network) protocol, and (c) an OFDM (Orthogonal Frequency Division Multiplexing) method.

33. A method for data transmission in a system, comprising:
- transmitting a power signal and a data signal alternately over at least one of (a) a physical medium and (b) a supply line;
- determining at least one of (a) a length of time segments for data signals and (b) an interval between the time segments for data signals by a power currently drawn by a consumer;
- wherein a time segment is respectively provided at regular temporal intervals between the time segment for data signals and a respectively following time segment for the power signal, in which neither data signals nor power signals are provided, to extinguish arcs in systems having a contactless power supply.

* * * * *